United States Patent [19]

Nashimoto

[11] Patent Number: 5,185,784
[45] Date of Patent: Feb. 9, 1993

[54] LINE SWITCHING APPARATUS
[75] Inventor: Chuzo Nashimoto, Kawasaki, Japan
[73] Assignee: Ricoh Company, Ltd., Tokyo, Japan
[21] Appl. No.: 825,780
[22] Filed: Jan. 21, 1992

Related U.S. Application Data

[63] Continuation of Ser. No. 466,619, Jan. 17, 1990, abandoned.

[30] Foreign Application Priority Data

Jan. 18, 1989 [JP] Japan .................. 1-10394
Sep. 29, 1989 [JP] Japan .................. 1-253939

[51] Int. Cl.[5] .......................................... H04M 11/00
[52] U.S. Cl. ........................................ 379/94; 379/100
[58] Field of Search ............ 379/94, 100, 93, 96, 379/97, 98, 210, 211, 212

[56] References Cited

U.S. PATENT DOCUMENTS

| | | | |
|---|---|---|---|
| 4,809,321 | 2/1989 | Morganstein et al. | 379/210 |
| 4,870,678 | 9/1989 | Adachi | 379/100 |
| 4,930,151 | 5/1990 | Walton et al. | 379/94 |
| 4,935,955 | 6/1990 | Neudorfer | 379/95 |

*Primary Examiner*—James L. Dwyer
*Assistant Examiner*—Stella L. Woo
*Attorney, Agent, or Firm*—Oblon, Spivak, McClelland, Maier & Neustadt

[57] ABSTRACT

A line switching apparatus is adapted for use with a communication apparatus which comprises a plurality of lines which are accommodated according to a key number system, a plurality of ports which aer connected to communication terminals, and a matrix switch which couples the lines and the ports. The line switching apparatus comprises an auxiliary apparatus, and a control part for detecting an arbitrary one of the ports which is down and not capable of making a communication, disconnecting the arbitrary port from one of the lines and connecting the one line which is originally connected to the arbitrary port to a port which is originally connected to a line of a last key number, and connecting the line of the last key number to the auxiliary apparatus.

9 Claims, 6 Drawing Sheets

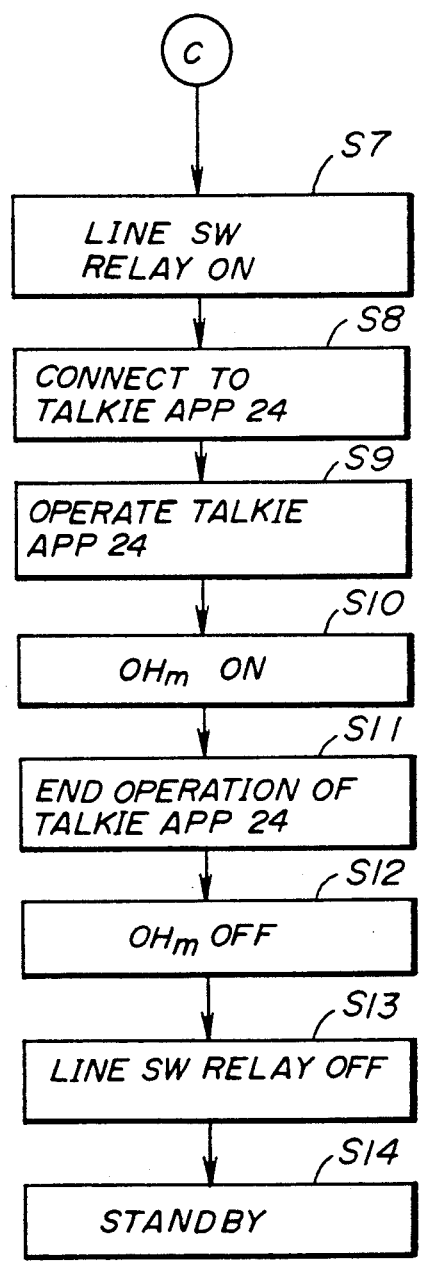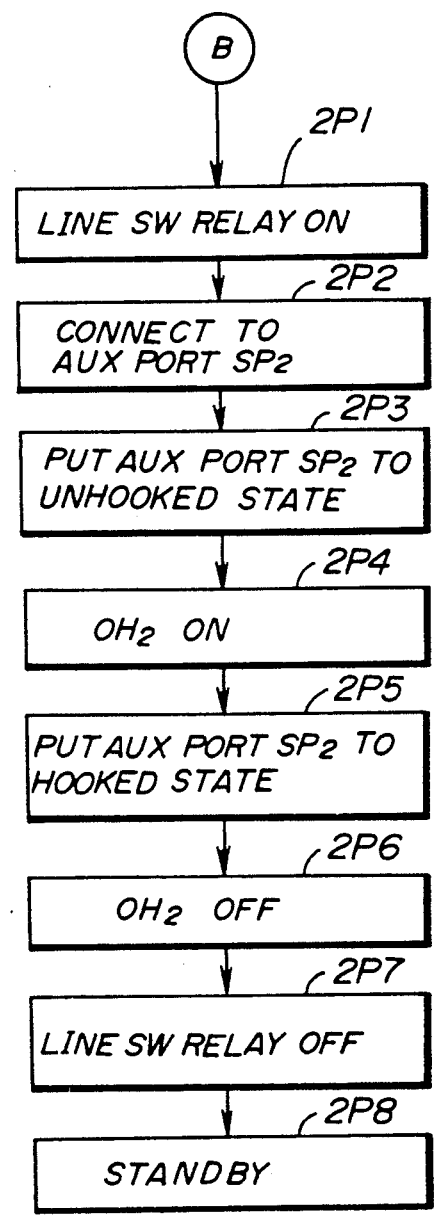

LINE SWITCHING APPARATUS

This application is a continuation of U.S. patent application Ser. No. 07/466,619, filed on Dec. 17, 1990, now abandoned.

BACKGROUND OF THE INVENTION

The present invention generally relates to line switching apparatuses, and more particularly to a line switching apparatus for use with a communication apparatus which accommodates a plurality of lines according to a key number system and a line switching apparatus which is coupled between a communication apparatus which accommodates a plurality of lines and a telephone line.

In communication apparatuses such as a facsimile store and forward apparatus and an answering apparatus which accommodate a plurality of lines, the lines are often accommodated according to a key number system. According to the key number system, the plurality of lines which are connected to the communication apparatus via the line switching apparatus are supervised by key numbers. When the line switching apparatus receives a call in to a subscriber of the communication apparatus, a line busy detection is made from a first key number. When the line of the first key number is busy, the line busy detection is made with respect to a second key number. The line busy detection is made until a non-busy line is detected or until it is detected that all of the lines are busy when carrying out a line detection process.

The communication apparatus has a plurality of ports, and a communication terminal having a communication function is coupled to each port. For example, the communication terminal may be a facsimile terminal, a talkie apparatus and the like. Conventionally, the connection of the lines and the ports of the communication apparatus is fixed, and the lines and the ports are directly connected, for example.

Accordingly, when the communication terminal which is coupled to a port is making a communication, the line which is coupled to this port is busy. Hence, when the line switching apparatus receives a call in to the subscriber, the line detection process is carried out to call a non-busy line.

On the other hand, there is a communication apparatus which accommodates a plurality of lines in one-to-one correspondence with a plurality of ports thereof, without employing the key number system. In this case, when the communication terminal which is coupled to a port is making a communication, the line which is coupled to this port is busy until the communication terminal ends the communication.

But because the conventional line switching apparatus has a fixed connection between the lines and the ports, a problem occurs when a port is down. The port is said to be "down" when the port is not capable of making a communication. When the port is down during the line detection process, the line which is coupled to the port which is down is called continuously and an appropriate line detection process cannot be made.

When the key number system is employed, the line switching apparatus carries out the line detection process in which the call is made from the line of the first key number to detect whether or not the line is busy and the call is made to the line of the next key number when the line of the first key number is busy. However, when the call is made to the port which is down, the line switching apparatus continues to call the same line because no response is received and no call is made to the line of the next key number. As a result, the line detection process stops at the port which is down, and it is impossible to call the line of the next key number.

On the other hand, in the case of the communication apparatus which accommodates the lines in one-to-one correspondence with the ports, no response is received from the port which is down until the port is restored. Therefore, the service deteriorates for the user who calls the communication apparatus from the communication terminal.

SUMMARY OF THE INVENTION

Accordingly, it is a general object of the present invention to provide a novel and useful line switching apparatus in which the problems described above are eliminated.

Another and more specific object of the present invention is to provide a line switching apparatus adapted for use with a communication apparatus which comprises a plurality of lines which are accommodated according to a key number system, a plurality of ports which are connected to communication terminals, and a matrix switch which couples the lines and the ports, which line switching apparatus comprises an auxiliary apparatus, and control means including first means for detecting an arbitrary one of the ports which is down and not capable of making a communication, second means for disconnecting the arbitrary port from one of the lines and connecting the one line which is originally connected to the arbitrary port to a port which is originally connected to a line of a last key number, and third means for connecting the line of the last key number to the auxiliary apparatus. According to the line switching apparatus of the present invention, it is possible to prevent the line detection process from stopping at the port which is down and also make it clear which one of the ports is down. As a result, it is possible to make an appropriate line detection process and promptly restore the port which is down.

Still another object of the present invention is to provide a line switching apparatus adapted for use between telephone lines and a communication apparatus which comprises a plurality of ports which connect to the telephone lines, a plurality of telephone terminals which respectively form a pair with corresponding ones of the ports and connect to the telephone lines via switching relays in a standby state and a plurality of auxiliary ports, which line switching apparatus comprises ringing detecting means coupled to the telephone terminals for detecting a ringing signal from the telephone lines, switching means for selectively connecting the telephone lines to the ports and the auxiliary ports, and control means for detecting a port which is down and not capable of making a communication based on a detection made by the ringing detecting means. The control means controls the switching means so that the telephone line of the port which is down is connected to the auxiliary port. According to the line switching apparatus of the present invention, it is possible to detect the port which is down and connect the line which is originally connected to the port which is down to the auxiliary port, so that the communication can be made via the auxiliary port. As a result, the service provided for the user of the communication terminal which calls the communication apparatus is improved.

DESCRIPTION OF THE PREFERRED EMBODIMENTS

A description will be given of a first embodiment of a line switching apparatus according to the present invention, by referring to FIGS. 1 and 2.

Figure 1:
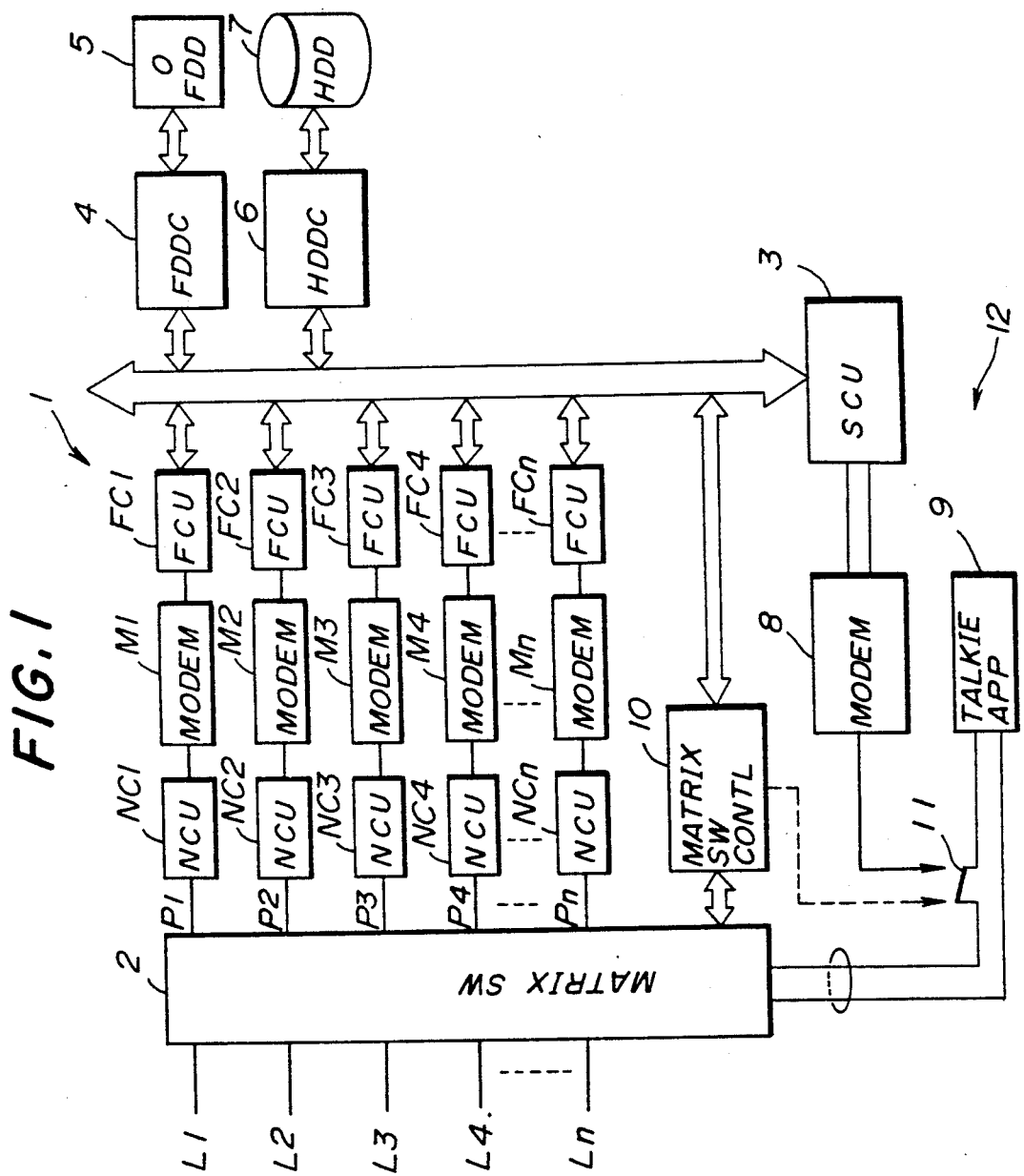
FIG. 1 is a system block diagram showing a facsimile store and forward apparatus to which a first embodiment of a line switching apparatus according to the present invention is applied.
Figure 2:
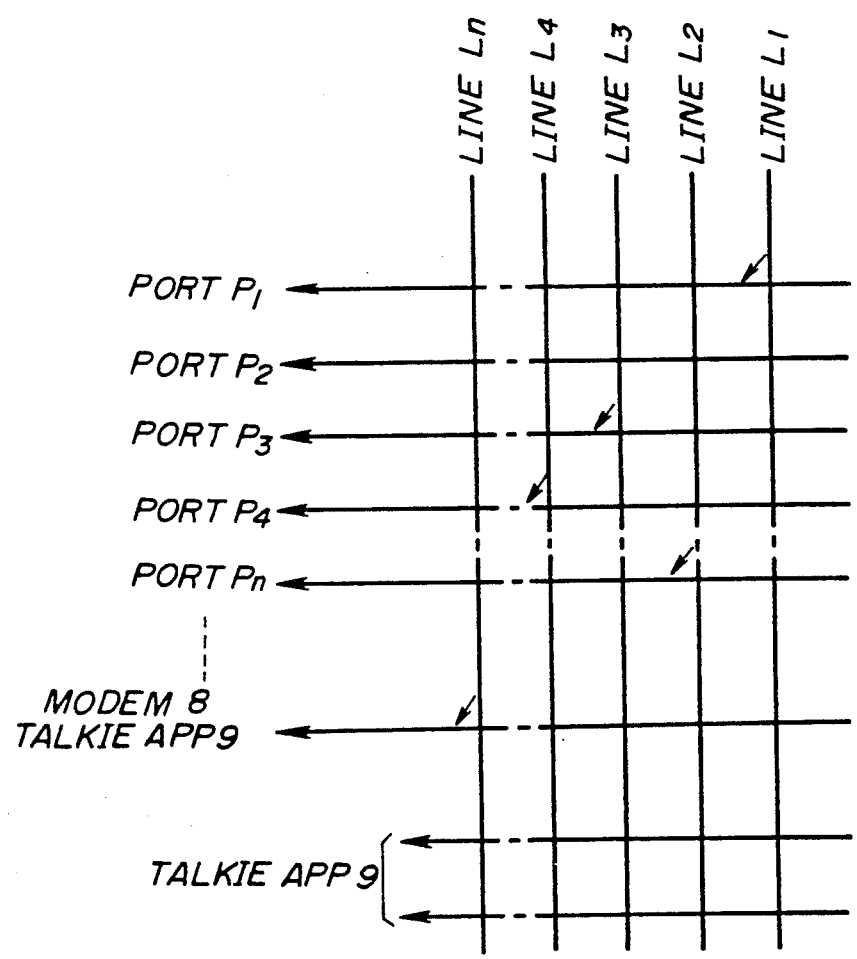
FIG. 2 is a schematic diagram showing a connection of a matrix switch of the first embodiment.

FIG. 1 shows a facsimile store and forward apparatus 1 which is used as a communication apparatus applied with the first embodiment. The facsimile store and forward apparatus 1 generally comprises a matrix switch 2, ports P1 through Pn, network control units (NCUs) NC1 through NCn, modems M1 through Mn, facsimile control units (FCUs) FC1 through FCn, a system control unit (SCU) 3, a floppy disk drive controller (FDDC) 4, a floppy disk drive (FDD) 5, a hard disk drive controller (HDDC) 6, a hard disk drive (HDD) 7, a modem 8 with NCU, a talkie apparatus 9, a matrix switch controller 10, and a switch 11.

A plurality of lines L1 through Ln are accommodated in the matrix switch 2 according to the key number system, and a plurality of ports P1 through Pn are provided in the matrix switch 2. As shown schematically in FIG. 2, the matrix switch 2 couples the lines L1 through Ln to the ports P1 through Pn and the talkie apparatus 9 under the control of the matrix switch controller 10. The switch 11 couples to the modem 8 the lines L1 through Ln which are coupled to the side of the talkie apparatus 9 by the matrix switch 2. The matrix switch 2 and the switch 11 constitute a line unit.

The NCUs NC1 through NCn are coupled to the corresponding ports P1 through Pn of the matrix switch 2 and respectively make a call set up, a disconnection and the like. The modems M1 through Mn respectively modulate a transmitting signal and demodulate a received signal. The FCUs FC1 through FCn respectively execute a control procedure by switching facsimile control signals with facsimile machines. The FCUs FC1 through FCn respectively have a compressing/expanding part, a buffer memory and the like and carry out an input operation and an output operation. During the input operation, each FCU stores the image data received from a facsimile machine into the buffer memory while subjecting the image data to a redundant suppression coding and transfers the image data to the FDD 5 or the HDD 7 when the buffer memory becomes full. During the output operation, each FCU stores the image data received from the FDD 5 or the HDD 7 into the buffer memory and transmits the image data while subjecting the image data to a redundant suppression coding in conformance with the facsimile machine. The NCUs NC1 through NCn, the modems M1 through Mn and the FCUs FC1 through FCn constitute communication terminals which are respectively coupled to the ports P1 through Pn.

The FDDC 4 controls the FDD 5 and stores the received image data into a floppy disk of the FDD 5. The image data stored in the floppy disk of the FDD 5 is managed in terms of files. A data area and a program area are provided on a hard disk of the HDD 7. The data area stores information such as the received image data, data for control, and port down information which is transmitted to a service center when a port is down. On the other hand, the program area stores programs such as basic programs of the facsimile store and forward apparatus 1 and line switching programs. The operation of the HDD 7 is controlled by the HDDC 6.

The modem 8 is coupled to the lines L1 through Ln via the switch 11 and the matrix switch 2. The modem 8 sends to the lines L1 through Ln the port down information and the like which are read from the HDD 7, and is used for the so-called remote maintenance. The talkie apparatus 9 is a so-called announce apparatus which accommodates a plurality of lines and is provided with a speech memory part and a speech input/output part. The talkie apparatus 9 prestores messages which correspond to the port down information and the like. For example, a message "not serviceable" is prestored in the talkie apparatus 9, and this message is sent to the lines L1 through Ln via the matrix switch 2 when the port is down. The modem 8 and the talkie apparatus 9 constitute an auxiliary apparatus 12 for coping with the port which is down.

The matrix switch controller 10 controls the connection of the matrix switch 2 depending on the instruction from the SCU 3.

The SCU 3 controls various parts of the facsimile store and forward apparatus 1 depending on the programs stored in the HDD 7, so as to carry out the sequential operation of the facsimile store and forward apparatus 1. The SCU 3 also carries out the line switching process.

The facsimile store and forward apparatus 1 accommodates the lines L1 through Ln according to the key number system. It will be assumed for the sake of convenience that the line L1 corresponds to the first key number and the line Ln corresponds to the last key number. When there is a call in to the facsimile store and forward apparatus 1, the switching system to which the lines L1 through Ln are connected first calls the line L1 which corresponds to the first number. When the response is busy with respect to this call, the switching system then calls the line L2 which corresponds to the second number. Such an operation is repeated until a non-busy line is found from the lines L1 through Ln. When a line Li is found to be a non-busy line, a facsimile communication is made from a NCU NCi, a modem Mi and a FCU FCi which constitute a communication terminal and are coupled to a port Pi which corresponds to the connected non-busy line Li.

However, a port Pj may be down due to some reason. For example, the port Pj may be down due to a failure of a CPU of the port Pj, a failure of a bus line, a failure of a NCUj and the like. The SCU 3 is informed that the port Pj is down, and the SCU 3 instructs the matrix switch controller 10 to switch the connection of the matrix switch 2. The data related to the line switching instruction and the program related to the line switching process are stored in the HDD 7. When the port Pj is down, the SCU 3 reads from the HDD 7 the program which is related to the line switching process by carrying out an interrupt process or the like and sends the line switching instruction to the matrix switch controller 10 based on the program and the data which is related to the line switching instruction.

The line switching instruction is made according to the following procedure.

(1) When the port Pj is down, the SCU 3 checks via the FCU FCn the busy state of the port Pn which accommodates the line Ln of the last key number.

(2) When the port Pn of the line Ln is not busy, the line Lj which is connected to the port Pj which is down is disconnected from the port Pj and is connected to the port Pn which is connected to the line Ln.

(3) The line Ln is connected to the modem 8 and the talkie apparatus 9.

(4) When the port Pn of the line Ln is busy at the step (2) described above, the line Lj which is connected to the port Pj which is down is disconnected from the port Pj and is connected to the talkie apparatus 9 until the line Ln becomes non-busy and available. When there is a call in in this state, the talkie apparatus 9 is operated to send the message described above on the line Lj.

(5) When the port Pn of the line Ln becomes non-busy at the step (4), the steps (2) and (3) described above are carried out.

In other words, when j=2 and the port P2 is down, the busy state of the port Pn which accommodates the line Ln of the last key number. When the port Pn is found to be non-busy, the line L2 which is connected to the port P is disconnected from the port P2 and is connected to the port Pn which is connected to the line Ln. In addition, the line Ln is connected to the modem 8 and the talkie apparatus 9. The facsimile store and forward apparatus 1 sends the port down information within the HDD 7 to the service station or the like via the line Ln so as to carry out the so-called remote maintenance. Accordingly, it is possible to promptly inform the port which is down and quickly restore the port which is down.

On the other hand, when the port Pn which is accommodates the line Ln is busy, the port P2 which is down is disconnected from the line L2 and is connected to the talkie apparatus 9. When there is a call in to the line L2, the talkie apparatus 9 is operated to send the message such as "not serviceable". Hence, when the line switching apparatus makes the line detection process to find the non-busy line with respect to the call in to the facsimile store and forward apparatus 1, it is possible to prevent the line detection process from stopping at the line which is connected to the port which is down. As a result, the line detection process is carried out appropriately and the communication terminal on the other side of the line is informed of the port which is down.

In this embodiment, it is assumed for the sake of convenience that one port is down. However, this embodiment is also applicable to a case where a plurality of ports are down at the same time. In this case, when a certain one of the lines connected to the ports which are down is already connected to the port which is connected to the line of the last key number, this certain line may be connected to the modem 8 and the talkie apparatus 9 or connected to the port which is connected to the line of the penultimate key number.

In addition, although the present invention is applied to the facsimile store and forward apparatus 1 in this embodiment, this embodiment is similarly applicable to any communication apparatus which accommodates a plurality of lines according to the key number system.

Next, a description will be given of a second embodiment of the line switching apparatus according to the present invention, by referring to FIGS. 3 through 5.

Figure 3:
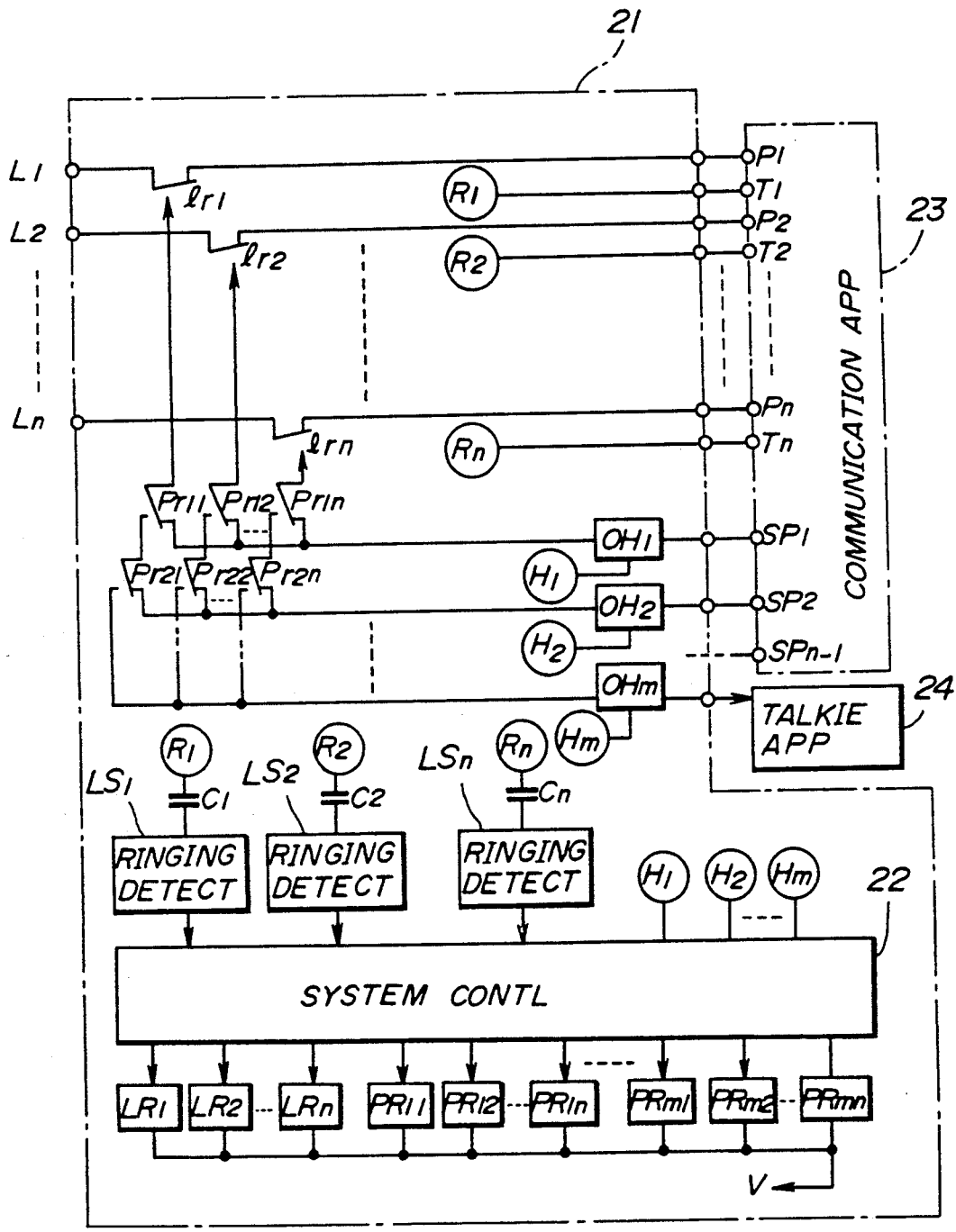
FIG. 3 is a system block diagram showing a second embodiment of the line switching apparatus according to the present invention.

FIG. 3 shows a line switching apparatus 21 which generally comprises line switching relays LR1 through LRn, port switching relays PR11 through PR1n, . . . , and PRm1 through PRmn, a D. C. loop detecting sensors OH1 through OHm, ringing detection circuits LS1 through LSn, and a system controller 22. The line switching apparatus 21 is provided between the communication apparatus 23 which accommodates a plurality of lines L1 through Ln and the lines L1 through Ln. For example, the communication apparatus 23 includes communication units such as facsimile units.

The lines L1 through Ln are coupled to ports P1 through Pn of the communication apparatus 23 via switch circuits lr1 through lrn of the line switching relays LR1 through LRn within the line switching apparatus 21. The line switching relays LR1 through LRn operate under the control of the system controller 22 and connect the lines L1 through Ln to the ports P1 through Pn of the communication apparatus 23 or the port switching relays PR11 through PR1n, . . . , PRm1 through PRmn. The port switching relays PR11 through PR1n, . . . , PRm1 through PRmn operate under the control of the system controller 22 and switch switching circuits pr11 through pr1n, . . . , prm1 through prmn. Hence, the lines L1 through Ln are connected to auxiliary ports SP1 through SPm-1 or a talkie apparatus 24.

The D. C. loop detecting sensors OH1 through OHm respectively detect the D. C. loop of the line and supplies a detection result to the system controller 22. In other words, the D. C. loop detecting sensors OH1 through OHm detect the busy state of the ports P1 through Pm-1 and the talkie apparatus 24 from the D. C. loops of the lines.

The ringing detection circuits LS1 through LSn are coupled to telephone terminals T1 through Tn of the communication apparatus 23 via capacitors C1 through Cn. The telephone terminals T1 through Tn respectively form a pair with the corresponding ports P1 through Pn and connect to the telephone lines via the switching relays in the standby state. The ringing detection circuits LS through LSn respectively detect a ringing signal and supplies a detection result to the system controller 22.

Figure 4:
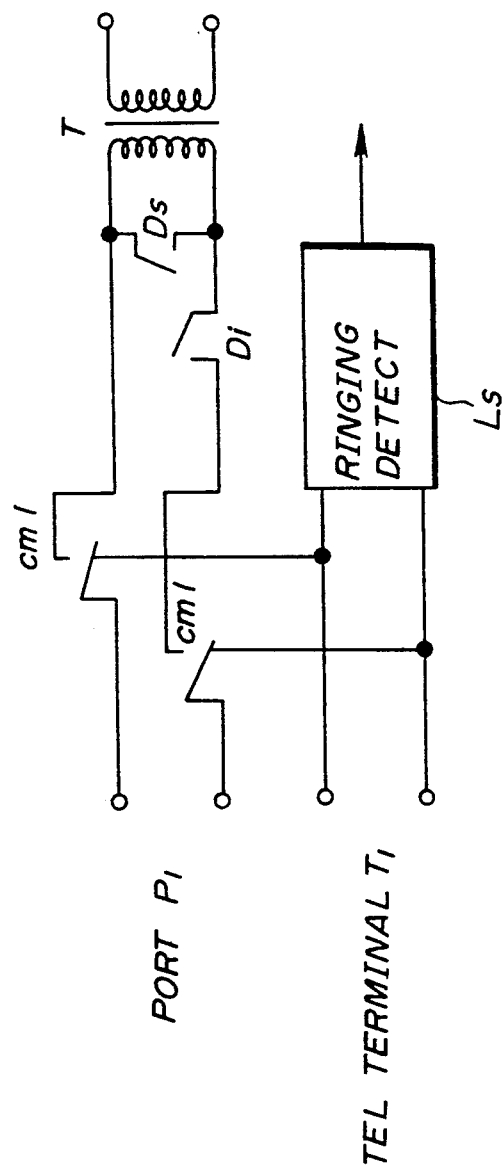
FIG. 4 is a circuit diagram showing an essential part of a port portion of a communication apparatus which is coupled to the second embodiment.
Figure 5A:
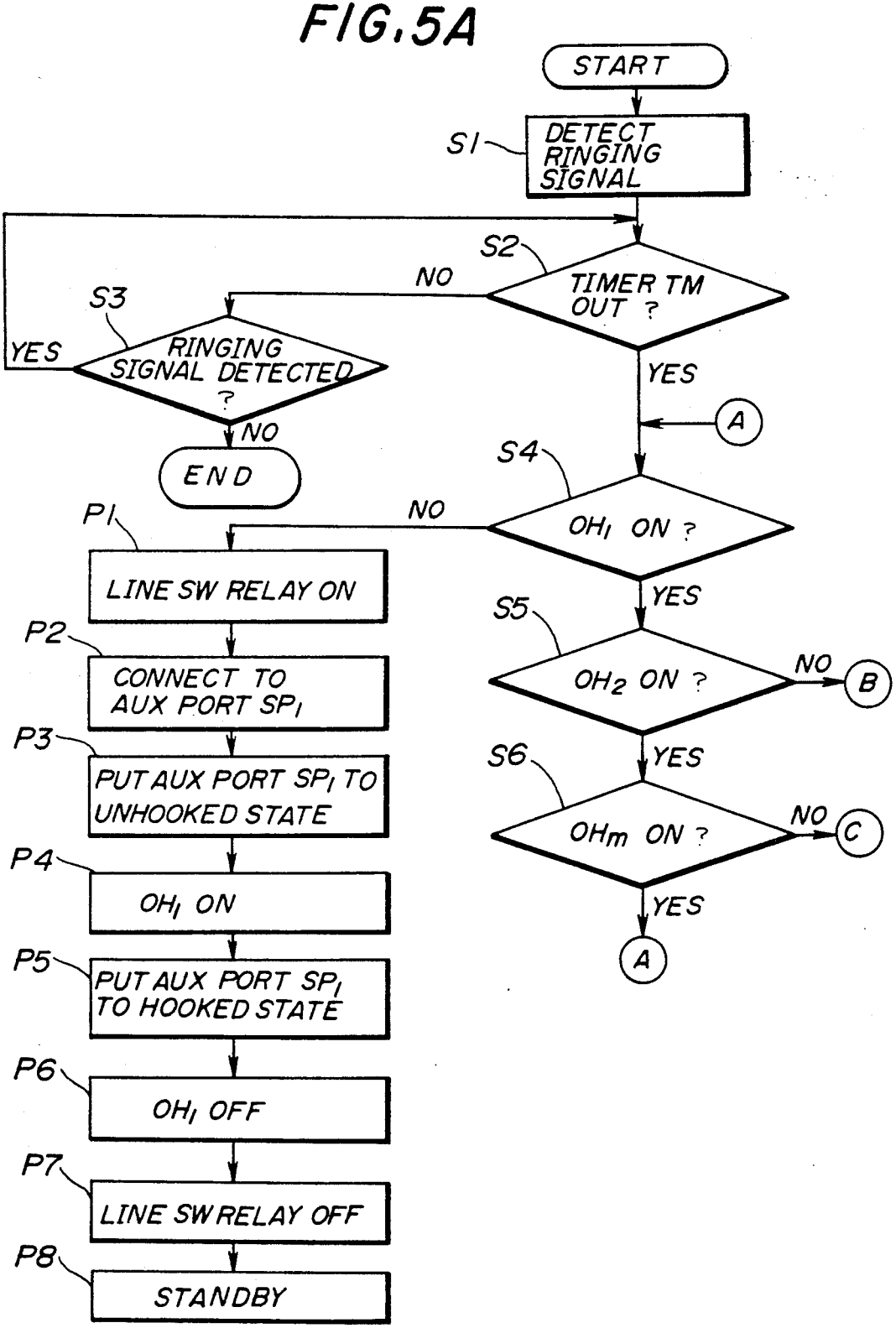
FIG. 5 is a flow chart for explaining a line switching process of the second embodiment.

The telephone terminals T1 through Tn are provided in correspondence with the ports P1 through Pn, and as shown in FIG. 4, the telephone terminals T1 through Tn are coupled to the ports P1 through Pn via switching relays cm1. The communication apparatus 23 includes the switching relays cm1, a dial shorting relay Ds, a dial pulse relay Di, a transformer T and a ringing detection circuit LS with respect to each of the ports P1 through Pn. A modem such as a facsimile unit is coupled to each of the ports P1 through Pn via the transformer T. Accordingly, the switching relays cm1 connect the lines L1 through Ln to the communication apparatus 23 or the telephone terminals T1 through Tn via the line switching apparatus 21. The ringing detection circuits LS1 through LSn respectively detect the ringing signals from the lines L1 through Ln via the switching relays cm1 and supply the detection results to the system controller 22.

The communication apparatus 23 has the auxiliary ports SP1 through SPm-1 and facsimile units or the like are coupled to these auxiliary ports SP1 through SPm-1 via the transformers T or the like. Hence, it is possible to carry out a communication process from the auxiliary ports SP1 through SPm-1 similarly to the communication process carried out from the ports P1 through Pn.

In FIG. 3, the talkie apparatus 24 is the so-called announce apparatus and includes a speech memory part and a speech input/output part. The speech memory part of the talkie apparatus 24 prestores messages in correspondence with the ports which are down. When one port is down, the corresponding message is sent to one of the lines L1 through Ln which are coupled via the line switching apparatus 21. The busy state of the talkie apparatus 24 is detected by the D. C. loop detecting sensor OHm and the detection result is supplied to the system controller 22.

The system controller 22 comprises a central processing unit (CPU), a read only memory (ROM), a random access memory (RAM) and the like, and the programs related to the line switching process are stored in the ROM. The system controller 22 controls various parts of the line switching apparatus 21 based on the programs within the ROM so as to carry out the line switching process.

This embodiment is characterized in that the line switching apparatus which is arranged in front of the communication apparatus which accommodates a plurality of lines detects a port of the communication apparatus which is down, and that the line which is connected to the port which is down is switched and connected to the auxiliary port of the communication apparatus. A description will now be given of the line switching process by referring to a flow chart shown in FIG. 5.

In the standby state of the line switching apparatus 21, the line switching relays LR1 through LRn connect the lines L1 through Ln to the ports P1 through Pn of the communication apparatus 23 and the port switching relays PR11 through PR1n, . . . , PRm1 through PRmn are respectively connected to the auxiliary ports SP1 through SPm-1 as shown in FIG. 3. In addition, the switching relays cm1 of the communication apparatus 23 connect the ports P1 through Pn to the telephone terminals T1 through Tn, and the ports P1 through Pn are also connected to the ringing detection circuit LS.

When the ringing signal is received from the lines L1 through Ln in this standby state, the ringing signal is detected by the ringing detection circuit LS of the communication apparatus 23. The ringing signal is also detected by the ringing detection circuits LS1 through LSn of the line switching apparatus 21. A step S1 shown in FIG. 5 detects the ringing signal. When the ringing signal is detected by one of the ringing detection circuits LS1 through LSn of the line switching apparatus 21, a timer TM is set. A step S2 discriminates whether or not a predetermined time is over in the timer TM. A step S3 discriminates whether or not the ringing signal is detected when the discrimination result in the step S2 is NO. The process returns to the step S2 when the discrimination result in the step S3 is YES. Hence, a check is made to determine whether or not to continue detecting the ringing signal until the predetermined time is over in the timer TM.

The predetermined time set in the timer TM is selected to a maximum ringing detection time of the communication apparatus 23. This maximum ringing detection time corresponds to a maximum time it takes from a time when the ringing signal is detected by the ringing detection circuit LS of the communication apparatus 23 to a time when the reception process starts, and is set depending on the specifications of the communication apparatus 23. When the ringing signal is no longer detected by the ringing detection circuits LS1 through LSn of the line switching apparatus 21 before the predetermined time is over in the timer TM, the discrimination result in the step S3 is NO. In this case, it is detected that one of the ports P1 through Pn which received the ringing signal is normal, that is, not down, and the process ends.

On the other hand, when the detection of the ringing signal by the ringing detection circuits LS1 through LSn continues until the predetermined time is over in the timer TM, the discrimination result in the step S2 is YES and it is detected that one of the ports P1 through Pn which received the ringing signal is down. In this case, the system controller 22 discriminates in a step S4 whether or not the D. C. loop detecting sensor OH1 is ON, so as to check whether or not the auxiliary port SP1 is in the busy state.

When the discrimination result in the step S4 is NO, it is detected that the auxiliary port SP1 is not in use. In this case, a step P1 turns ON one of the line switching relays LR1 through LRn which corresponds to one of the lines L1 through Ln which received the ringing signal. For example, the line switching relay LR2 is turned ON. In this case, a step P2 connects the line L2 to the auxiliary port SP1. A step P3 puts the auxiliary port SP1 in a state which corresponds to an unhooked state of a telephone set. A step P4 turns the D. C. loop detecting sensor OH1 ON, thereby making a communication via the auxiliary port SP1. When the communication via the auxiliary port SP1 ends thereafter a step P5 puts the auxiliary port SP1 in a state which corresponds to a hooked state of a telephone set. A step P6 turns the D. C. loop detecting sensor OH1 OFF. The system controller 22 in a step P7 turns OFF one of the line switching relays LR1 through LRn. The line switching relay LR2 is turned OFF, for example, and the lines L1 through Ln are connected to the communication apparatus 23. A step P8 returns the line switching apparatus 21 to the standby state.

When the discrimination result in the step S4 is YES, the auxiliary port SP1 is in use, and a step S5 discriminates whether or not the D. C. loop detecting sensor OH2 is ON. When the discrimination result in the step S5 is NO, steps 2P1 through 2P8 are carried out to enable communication via the auxiliary port SP2. The steps 2P1 through 2P8 are basically the same as the corresponding steps P1 through P8, and a description thereof will be omitted.

When the discrimination result in the step S5 is YES, the D. C. loop detecting sensors OH3 through OHm-1 are successively checked similarly to the D. C. loop detecting sensors OH1 and OH2 so as to enable communications via the auxiliary ports SP3 through SPm-1 which are not in use. When all of the D. C. loop detecting sensors OH1 through OHm-1 are ON, all of the auxiliary ports SP1 through SPm-1 are in use and not available. In this case, a step S6 discriminates whether or not the D. C. loop detecting sensor OHm is ON.

When the discrimination result in the step S6 is NO, a step S7 turns one of the line switching relays LR1 through LRn ON. A step S8 turns ON one of the port switching relays PR11 through PR1n, . . . , PRm1 through PRmn corresponding to the line switching relay which is ON, so as to connect the lines L1 through Ln to the talkie apparatus 24. When the lines L1 through Ln are connected, the talkie apparatus 24 in a step S9 starts to operate and a message which indicates that the port is down is sent to the lines L1 through Ln. When the talkie apparatus 24 starts to operate, a step S10 turns ON the D. C. loop detecting sensor OHm. Thereafter, a step S11 ends the operation to the talkie apparatus 24, and a step S12 turns OFF the D. C. loop detecting sensor OHm. When the D. C. loop detecting sensor OHm is OFF, the system controller 22 turns OFF the line switching relays LR1 through LRn and the port switching relays PR11 through PR1n, . . . , PRm1 through PRmn in a step S13. A step S14 returns the line switching apparatus 21 to the standby state.

When the D. C. loop detecting sensor OHm is ON and the discrimination result in the step S6 is YES, all of the auxiliary ports SP1 through SPm-1 and the talkie apparatus 24 are in use. Hence, the process in this case returns to the step S4 so as to detect the D. C. loop detecting sensor OHm which is OFF while the ringing signal is received.

According to this embodiment, it is possible to detect the port of the communication apparatus 23 which is down, and switch and connect the line which is connected to the port which is down to the auxiliary port. As a result, the service provided for the user of the communication terminal which calls the communication apparatus 23 is improved. In addition, when all of the auxiliary ports are in use, the line is connected to the talkie apparatus 24 to inform the port which is down. For this reason, it is possible to further improve the service provided for the user of the communication terminal which calls the communication apparatus 23.

When the line switching apparatus 21 is arranged in front of the communication apparatus which accommodates a plurality of lines according to the key number system, it is possible to obtain the same effects as those obtainable in the first embodiment.

Further, the present invention is not limited to these embodiments, but various variations and modifications may be made without departing from the scope of the present invention.

What is claimed is:

1. A line switching apparatus adapted for use with a communication apparatus which comprises a plurality of lines which are accommodated according to a key number system, a plurality of ports which are connected via line inputs of communication terminals to said communication terminals, said communication terminals also having control inputs, and a matrix switch which couples the lines and the ports, said line switching apparatus comprising:

an auxiliary apparatus; and control means including first means for detecting via the control inputs of said communication terminals an arbitrary one of the ports which is down and not capable of making a communication, second means for disconnecting the arbitrary port from one of the lines and connecting the one line which is originally connected tot he arbitrary port to a port which is originally connected to a line of a last key number, and third means for connecting the line of the last key number to said auxiliary apparatus.

2. The line switching apparatus as claimed in claim 1 wherein said second means comprises a matrix switch controller for controlling a connection of the matrix switch 3. The line switching apparatus as claimed in claim 1 wherein said third means comprises a switch which connects the line of the last key number to said auxiliary apparatus in response to at least one of control signals output from said first and second means.

4. The line switching apparatus as claimed in claim 1 wherein said auxiliary apparatus is a talkie apparatus and said control means further includes fourth means for operating said talkie apparatus to send a message on the line of the last key number, said message indicating that the arbitrary port is down.

5. The line switching apparatus as claimed in claim 1 wherein said control means further comprises fourth means for detecting whether or not the port which is originally connected to the line of the last key number is busy.

6. The line switching apparatus as claimed in claim 5 wherein said control means further includes fifth means for disconnecting the one line from the arbitrary port and connecting the one line to said auxiliary apparatus until the line of the last key number becomes non-busy.

7. The line switching apparatus as claimed in claim 1 wherein said auxiliary apparatus comprises a talkie apparatus and a modem which is coupled to said control means.

8. The line switching apparatus as claimed in claim 1 wherein each of the communication terminals include a network control unit, a modem and a facsimile control unit.

9. The line switching apparatus as claimed in claim 8 wherein said line switching apparatus constitutes a facsimile store and forward apparatus together with the communication apparatus.

* * * * *